Feb. 1, 1938.  D. W. SHERMAN  2,107,191

AUTOMOBILE FRAME ADJUNCT

Filed Oct. 30, 1936

Donald W. Sherman
INVENTOR.

BY *Elvin C. Andrus*
ATTORNEY.

Patented Feb. 1, 1938

2,107,191

UNITED STATES PATENT OFFICE 2,107,191

AUTOMOBILE FRAME ADJUNCT

Donald W. Sherman, Shorewood, Wis., assignor to A. O. Smith Corporation, Milwaukee, Wis., a corporation of New York Application October 30, 1936, Serial No. 108,323

4 Claims. (Cl. 280—106)

This invention relates to an automobile frame adjunct such as a support for a shock absorber.

The object of the invention is to provide a support of more simple construction and which may be more readily secured in place.

Other objects will appear hereinafter.

The preferred embodiment of the invention is illustrated in the accompanying drawing in which.

Figure 1:
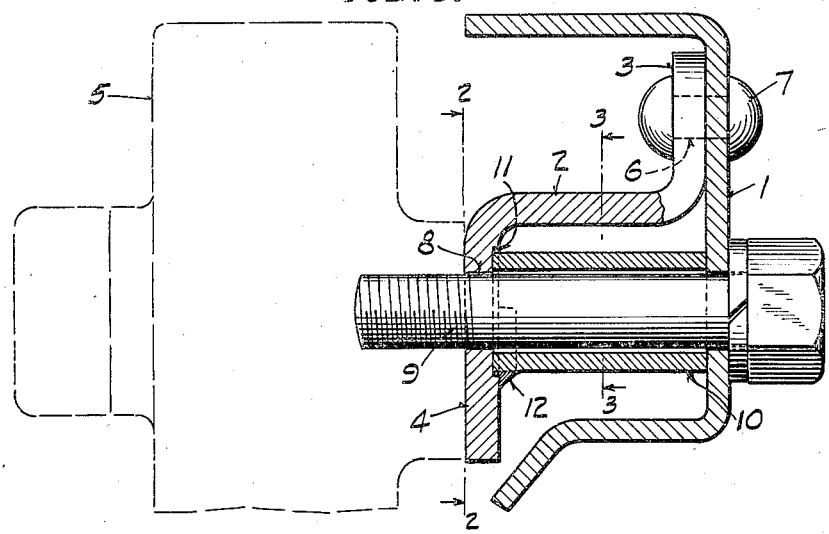
Figure 1 is a transverse section through a support and side frame member showing a shock absorber in dotted lines attached thereto.
Figure 2:
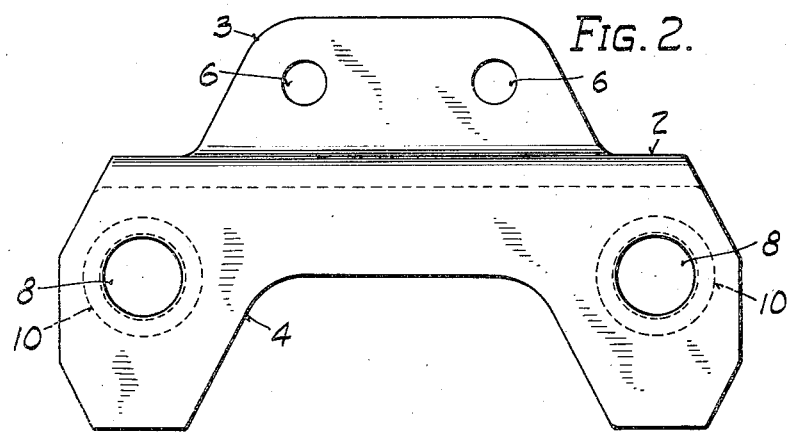
Fig. 2 is a side elevation of the support taken on line 2—2 of Fig. 1.
Figure 3:
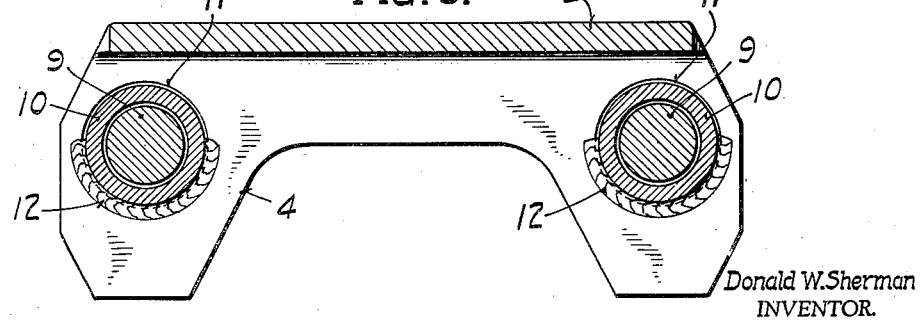
Fig. 3 is a vertical section on line 3—3 of Fig. 1.

The side bar 1 of the automobile frame is of the usual channel section and may have its lower flange bent downwardly at the edge as shown in the drawing.

The support comprises generally a sheet metal member having a horizontal body 2, an upwardly extending flange 3 on one edge for engagement with the vertical web of the side bar 1, and a downwardly extending flange 4 on its opposite edge for holding the shock absorber 5.

The upper flange 3 of the support has two spaced holes 6 through which rivets 7 pass for securing the support to the side bar 1.

The lower flange 4 of the support has two spaced holes 8 through which threaded lugs 9 pass for securing the shock absorber 5 in place. The lugs 9 extend through the vertical web of the side bar 1 as shown.

For the purpose of reenforcing the flange 4 against the pressure of the shock absorber caused by tightening of the lugs 9, a tubular brace 10 is welded to the flange 4 surrounding each opening 8 and extending into engagement with the vertical web of the side bar 1. The tubular brace 10 surrounds the lug 9 and serves to transmit the forces created by tightening of the lug from the flange 4 to the head of the lug.

In securing the brace 10 to the flange 4 it is preferable to recess the flange at 11 about the opening 8 to receive the end of the brace 10, and the latter is then welded as at 12 to the flange 4.

The brace 10 need not be secured at its outer end to the web of the side bar 1.

The support is simple in design and light in weight and can be readily secured to the side bar since the rivets 7 are disposed in a position for ready access during riveting.

The invention is claimed as follows:

1. In an automobile frame having a channel shaped bar, an attachment comprising a sheet metal member having a horizontal body connecting two flanges, one flange extending upwardly and being attached to the vertical web of the channel bar, and the other flange extending downwardly and holding a part to be fastened to the frame, said last named flange being parallel to and spaced from the vertical web of the channel bar, and means extending between said last named flange and the vertical web of the channel bar for bracing the former against the latter.

2. In an automobile frame having a channel shaped bar, an attachment comprising a sheet metal member having a horizontal body connecting two flanges, one flange extending upwardly and being riveted to the vertical web of the channel bar, and the other flange extending downwardly and holding a part to be fastened to the frame, aligned openings in said last named flange and the vertical web of the channel bar, a bolt passing through said openings to fasten the part to the frame, and means adjacent the body of the bolt and extending to the last named flange and the vertical web of the channel bar for bracing said flange.

3. In an automobile frame having a channel shaped bar, an attachment comprising a sheet metal member having a horizontal body connecting two flanges, one flange extending upwardly and being riveted to the vertical web of the channel bar, and the other flange extending downwardly and holding a part to be fastened to the frame, aligned openings in said last named flange and the vertical web of the channel bar, a bolt passing through said openings to fasten the part to the frame, and a tubular brace surrounding said bolt and extending to the last named flange and the vertical web of the channel bar for bracing said flange against pressure applied by said bolt.

4. In an automobile frame having a channel shaped bar, an attachment comprising a sheet metal member having a horizontal body connecting two flanges, one flange extending upwardly and being riveted to the vertical web of the channel bar, and the other flange extending downwardly and holding a part to be fastened to the frame, aligned openings in said last named flange and the vertical web of the channel bar, a bolt passing through said openings to fasten the part to the frame, and a tubular brace surrounding said bolt and extending between the last named flange and the vertical web of the channel bar for bracing said flange against pressure applied by said bolt, said tubular brace having one end fitted into a recess in said flange and welded to the flange.

DONALD W. SHERMAN.